Dec. 28, 1937.  L. W. KOLOZSY  2,103,420
METHOD OF AND APPARATUS FOR PRODUCING TELEVISION PICTURES
Filed March 28, 1934   2 Sheets-Sheet 2
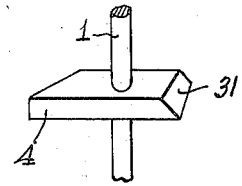
Fig.6
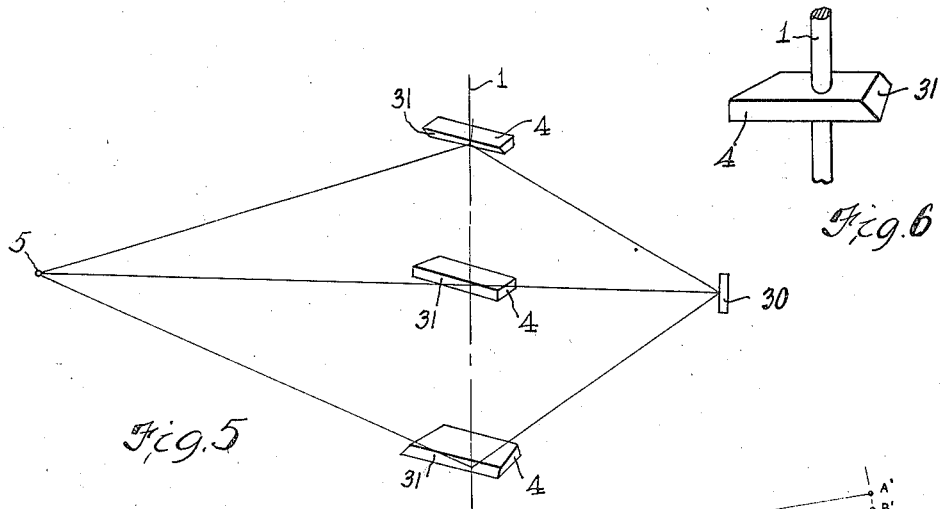
Fig.5
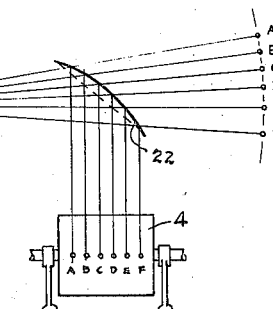
Fig.3ª
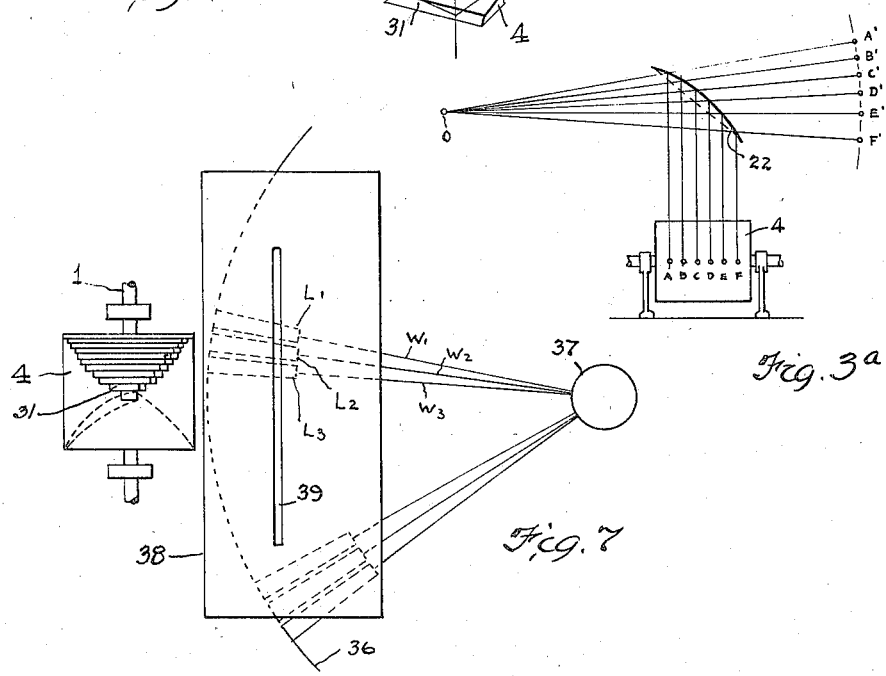
Fig.7
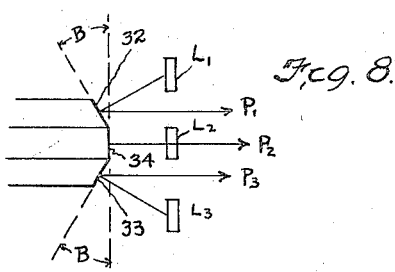
Fig.8.
INVENTOR.
Louis W. Kolozsy
BY
Fay, Oberlin & Fay
ATTORNEYS Patented Dec. 28, 1937

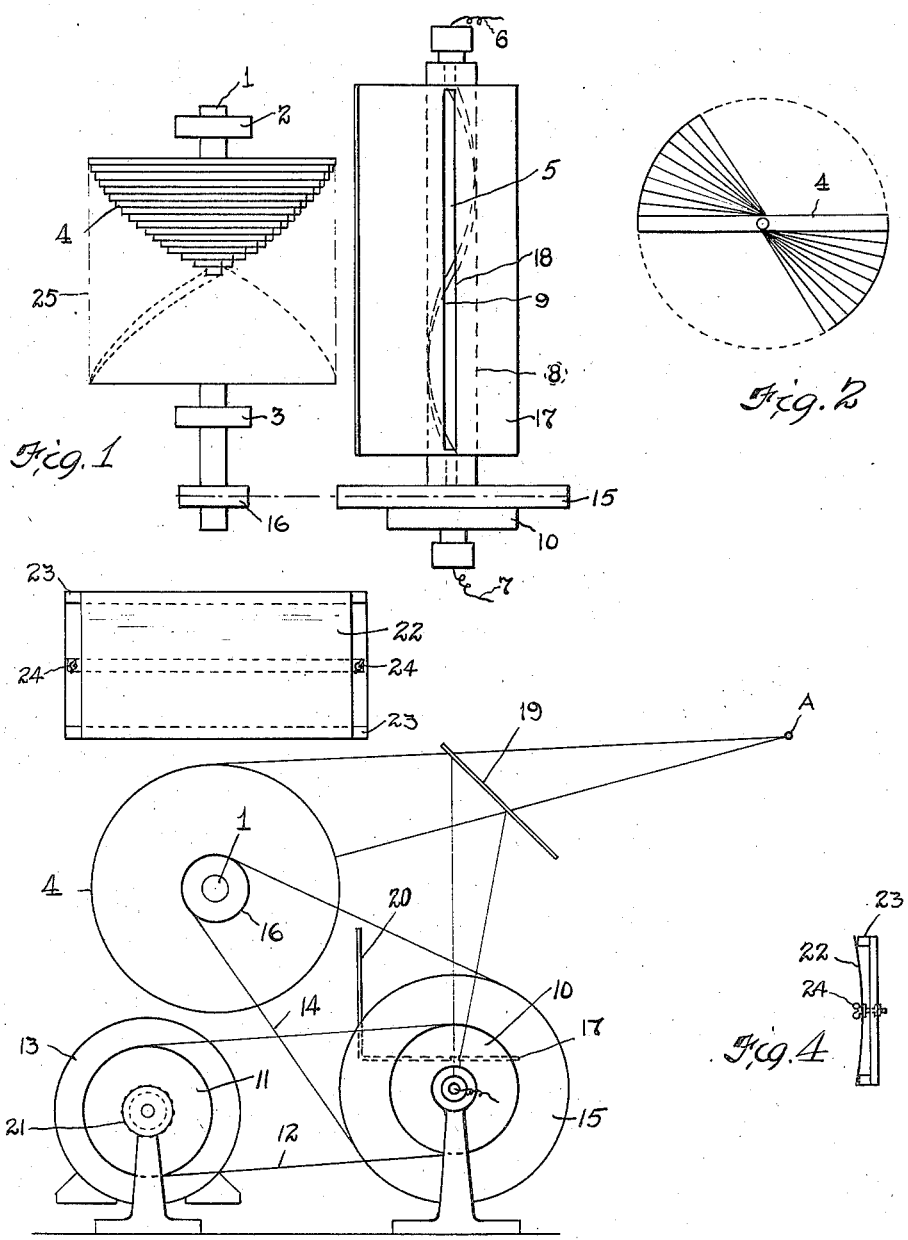

2,103,420

UNITED STATES PATENT OFFICE 2,103,420

METHOD OF AND APPARATUS FOR PRODUCING TELEVISION PICTURES

Louis W. Kolozsy, Astoria, N. Y., assignor to Television and Electric Corporation of America, New York, N. Y., a corporation of Delaware Application March 28, 1934, Serial No. 717,841

9 Claims. (Cl. 178—7.6)

The present invention relating as indicated to a method and apparatus for producing television pictures, refers more precisely to a means and method for transposing the image of an intermittent light source from a single point to a distribution over a desired area, whereby each image or point is adapted to occupy an individual space on such area and to thereby produce a certain design or picture.

The general object and nature of the invention is to produce television pictures by a means of a relatively simple means and method whereby complicated and expensive apparatus may be eliminated, and whereby the apparatus embodying the principle of the invention will readily lend itself to economy of manufacture, facility of operation, and a substantial reduction in size. Additional objects and advantages of the invention will become apparent as the following description proceeds.

To the accomplishment of the foregoing and related ends, said invention, then, consists of the means hereinafter fully described and particularly pointed out in the claims.

The annexed drawings and the following description set forth in detail certain structure embodying the invention, such disclosed means constituting, however, but one of various structural forms in which the principle of the invention may be used.

In said annexed drawings:

Fig. 1 is a plan view of one form of apparatus embodying the principle of my invention; Fig. 2 is an elevation of one of the elements shown in Fig. 1; Fig. 3 is an elevational view of the apparatus shown in Fig. 1; Fig. 3a illustrates the principle of operation of the parabolic reflector used in the apparatus shown in Fig. 3; Fig. 4 is an end view of the adjustable focus parabolic reflector used in the combination of Fig. 3; Fig. 5 illustrates a modified form of the invention; Fig. 6 is a detail of one of the reflecting mirrors as used in the form of the invention as illustrated by Fig. 5; Fig. 7 illustrates still another form of the invention; and Fig. 8 is an enlarged detail showing the modified form of construction of the reflecting mirrors as used in the combination of Fig. 7.

It is to be assumed that it is well known to those skilled in the art, that television pictures are transmitted and reproduced by means of effecting a plurality of intermittent flashes from the light source such as a neon lamp. The flashes of light, together with the dark intervals between such flashes, correspond to a plurality of dots or points of light and dark which are to be regularly distributed over a certain area. Homely analogy for the last-mentioned effect may well be made to the stipling process of printing pictures.

The wireless transmission and reception of the signals which give rise to television reproduction forms no part of my present invention. Rather is the instant invention related to the problem of transposing the intermittent flashes from the light source after reception, so that such flashes will occupy individual spaces or points of a regular and predetermined pattern and thereby result in a picture when viewed by the human eye.

Now referring more particularly to the annexed drawings, and especially in Figs. 1 to 4 inclusive thereof, there has been shown a rotatable shaft 1 mounted upon suitable bearings 2 and 3, and a plurality of long thin mirrors 4 are mounted on the shaft 1 and have their reflecting surfaces disposed in planes parallel to the axis of the shaft. Each one of the mirrors 4 is radially inclined one from the other at an equal angle of inclination, thereby occupying a spiral line of disposition along their common axes.

A neon lamp 5, which is connected to suitable electric terminals 6 and 7 is positioned adjacent and parallel to the shaft 1. A tube 8 has a spiral slot 9 making a single turn throughout the length of the tube, and surrounds the neon lamp 5. The tube 8 is rotatable, and adapted to be driven by suitable gears 10 and 11 and chain 12 from the electric motor 13. A connecting chain 14 also connects the large gear 15, which is mounted on the same shaft as the gear 10, to the small gear 16. Small gear 16 is in turn mounted on the shaft 1.

As the shaft 1 together with the mirrors 4 is rotated, it will be seen that a plurality of the reflecting surfaces will be adapted to reflect light from the lamp 5 into an apparent moving point which will move from left or right as the case may be, dependent upon the direction of rotation of the shaft and mirrors. Each mirror 4 or reflecting surface will produce an apparent moving image. Therefore, in a series of mirrors 4, which are mounted contiguous to each other and radially inclined, a series of parallel moving points will result. As the mirrors 4 rotate, the tube 8 also rotates, and by virtue of the provision of the spiral slot 9, it will be seen that a spot of light will move down the length of the tube 8. An opaque panel 17 having a slot 18 therein is positioned over the tube 8, serving as a shader and preventing the diffusion of light which is to be reflected.

In order to conserve space, which would be necessary if the lamp 5 were placed at its proper distance from the reflecting mirrors 4, a mirror 19 is placed above the lamp 5 at such an angle that it will reflect light from the lamp onto the series of mirrors 4. Otherwise, it would be necessary that the light source occupy a position as indicated by the letter A. A second opaque shield 20 is also found advantageous in order to prevent improper diffusion of light and to insure the fact that only the desired light rays will be reflected and directed upon the surface of the mirrors 4.

If a great number of mirrors 4 are used, it follows that the degree of angular inclination between each mirror must become relatively smaller. For example, if sixty mirrors are to be used, they can be spaced only six degrees apart in one complete circle. Also since the motion of the light point is directly proportional with the size of the angle of inclination between the mirrors, it is therefore desirable that such angle be maintained as large as possible. Accordingly, in order to effect a suitable angular inclination between the respective mirrors, it is contemplated that a plural turn spiral arrangement of the mirrors be used. Thus, for example, if there are sixty mirrors spaced 18° apart, the entire series will be disposed in a spiral of 1080° or three convolutions.

The velocity of rotation of the tube 8 and the mirrors 4 is so synchronized that the tube 8 is adapted to make one revolution per picture and the series of mirrors 4 one revolution per spiral convolution per picture. Thus, for example, if there are to be produced twenty pictures per second, the motor 13 and tube 8 will operate at a velocity of 1200 revolutions per minute, the ratio between the gears 10 and 11 of course being one to one; and if there are three convolutions in the spiral series of mirrors 4, the velocity of the shaft 1 will be 3600 revolutions per minute, the ratio between the gears 15 and 16 being 3 to 1.

A manipulating knob 21 is provided on the shaft of the motor 13 in order to produce proper adjustment of phase whereby the rotating shafts will be properly synchronized and the picture accordingly properly framed.

Since the reflected light rays coming from the series of mirrors 4 will all travel in parallel paths, and therefore will not present a proper image to the observer unless he is at a distance corresponding to infinity from the image, the parabolic mirror 22 is mounted above the series of mirrors 4 and serves the purpose of converging the parallel light rays. The principle of operation of the parabolic mirror 22 is further explained by reference to Fig. 3a. In this latter figure, the light rays reflected from the spiral series of mirrors 4, and as diagrammatically referred to by the letters A, B, C, D, E, and F, are reflected by the parabolic mirror 22 in such a manner that they will converge at the focal point 0, where the observer is located. The image of the points A, B, C, D, E, and F will appear to the observer to be located on a bent or curved plane at the points A', B', C', D', E', and F'. Furthermore the resultant image or picture will appear to be of larger proportions to the observer, since the parabolic mirror 22 also produces a magnifying effect. The mirror 22 is fabricated from plated or polished sheet metal and which rests at its upper and lower edges upon the frame 23. On either end of the mirror, and also connected to the frame 23 are the thumb screws 24, which when tightened or loosened will vary the curvature of the mirror and accordingly vary its focal point.

It has also been found advisable to enclose a series of mirrors 4 in a glass cylinder 25 in order to eliminate air resistance and noise due to the high velocity of rotation of the mirrors.

The principle of a modified form of construction of the apparatus is illustrated in Figs. 5 and 6. In these latter figures, the numeral 5 represents the light source or lamp and the numeral 30 represents the image or position of the observer. The reflecting surfaces 31 of the series of mirrors 4, instead of being parallel to the axis of the shaft 1 are inclined therefrom at varying degrees. For example, the outermost of the series of mirrors will possess the greatest angular inclination, and the intermediate mirror surface will have a progressively lesser angular inclination approaching the central mirror whose reflecting surface is disposed at 0° angular inclination or parallel to the axis of the shaft 1. In this manner, the presence of the parabolic or converging mirror 22 is eliminated.

Where it is desired to substantially increase the number of points or spots which compose the television picture, and since there is of course a practical limitation upon the velocity of rotation of the moving parts and also a limitation upon the frequency of operation of the lamp, the modified form of construction shown in Figs. 7 and 8 has been devised. From the previous description, it has been seen that by making the reflecting surfaces of the mirrors 4 not parallel with the shaft, that it is possible to reflect light from a light source that is not in line with the mirror surface. Accordingly, as is shown in Fig. 8, which represents a cross section of one of the mirrors, the reflecting surfaces 32 and 33 thereof are disposed at an angle B away from parallel. The reflecting surface 34 is parallel to the shaft supporting the mirror. Three different light sources, therefore, as represented by the reference numerals $L^1$, $L^2$ and $L^3$ may be so positioned as to have their light rays reflected in parallel paths $P^1$, $P^2$ and $P^3$ respectively.

To accomplish such a disposition of the light sources $L^1$, $L^2$ and $L^3$, they are placed upon the periphery of a large wheel 36, in radially spaced sheets of three. Connecting wires $W^1$, $W^2$ and $W^3$, connect each one of the respective light sources $L^1$, $L^2$ and $L^3$ to a suitable commutator 37 upon the hub or shaft of the wheel 36. A shield 38 having a slot 39 therein is positioned between the series of mirrors 4 and the lamps $L^1$, $L^2$ and $L^3$. A reflecting mirror, which is not shown in Fig. 7, is also interposed between the rotating mirrors 4 and the light source as was previously explained in connection with Fig. 3.

In operation, each one of the lamps $L^1$, $L^2$ and $L^3$ is actuated by a different signal which is received through three different receiving sets, and each one of the lamps $L^1$, $L^2$ and $L^3$ will produce adjacent lines of the picture. Thus, for example lamp $L^1$ will produce lines 1, 4 and 7 of the picture and lamp $L^2$ will produce lines 2, 5 and 8, etc. In this manner the frequency of operation of the light sources is substantially reduced, but the number of spots or points on the resultant picture may be greatly increased. The wheel 36 will be rotated at a speed corresponding to the number of pictures desired per second divided by the number of lamp sets which it carries; for example, if the picture frequency is twenty pictures per second, and there are six lamp sets on the periphery of the wheel 36, then the speed of rotation of the wheel will be 3⅓ revolutions per second.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention

1. In an apparatus for producing television pictures, the combination of a variable light source, and a plurality of movable reflecting surfaces adapted to project the light rays from said source into a series of parallel and coextensive paths, and a transparent cylinder surrounding said reflecting surfaces.

2. In an apparatus for producing television pictures, the combination of a variable light source with an undulatory light-releasing slot revoluble before said light source, a plurality of movable reflecting surfaces adapted to project the light rays from said source into a series of parallel and coextensive paths, and a transparent cylinder surrounding said reflecting surfaces.

3. In an apparatus for producing television pictures, the combination of a variable light source, a plurality of adjacent reflecting surfaces rotatable about a common axis and radially spaced apart at equal angles and adapted to project the light rays from said source into a common viewing field, a converging reflector for converging said parallel light rays toward a predetermined point, and means for regulating the convergency of said reflector.

4. In an apparatus for producing television pictures, the combination of a variable light source, a light-transmitting slot therebetween, a plurality of superimposed reflecting surfaces rotatable about a common axis and being radially spaced apart at equal angles and inclined to such axis, a transparent cylinder about said rotatable reflecting surfaces, and a reflector interposed between said light source and said plurality of rotatable reflecting surfaces.

5. In an apparatus for producing television pictures, the combination of a plurality of variable light sources each actuated by its own portion of a tranmitting field, a plurality of reflecting surfaces rotatable about a common axis and inclined to such axis and being mounted in spiral relationship and adapted to project the light rays from said sources to a common viewing field, a transparent cylinder about said rotatable reflecting surfaces, and a intermediary reflector interposed between said light sources and said rotatable reflecting surfaces.

6. In an apparatus for producing television pictures, the combination of a variable light source, a plurality of adjacent reflecting surfaces rotatable about a common axis and radially spaced apart at equal angles and adapted to project the light rays from said source into a common viewing field, a flexible converging reflector for converging said parallel light rays toward a predetermined point, and screw-threaded means for regulating the curvature of said reflector.

7. In an apparatus for producing television pictures, the combination of a plurality of variable light sources each actuated by its own point in a transmitting field, rotatable means carrying said light sources, a rotatable shaft adjacent said means, a plurality of reflecting surfaces mounted on said shaft and inclined to the axis with progessively increasing angular inclination from the center of the series to the outermost, and a light-permeable slot between said sources of light and said series each way of reflecting surfaces.

8. In an apparatus for producing television pictures, the combination of a variable light source with an undulatory light-releasing slot revoluble before said light source, a rotatable shaft spaced from and parallel to said source, a plurality of reflecting surfaces mounted on said shaft in equiangular spiral relationship and adapted to project the light rays from said source into longitudinally parallel and coextensive paths, a transparent cylinder surrounding said reflecting surfaces, and an adjustable focus reflector for converging said parallel light rays toward a predetermined point.

9. In an apparatus for producing television pictures, the combination of a plurality of variable light sources, each of said light sources being adapted to emit light upon the receipt of signal impulses transmitted on different wave lengths, a plurality of movable reflecting surfaces adapted to project the light rays from said light source into a series of transversely parallel and longitudinally converging paths and a transparent cylinder surrounding said reflecting surfaces.

LOUIS W. KOLOZSY.